US011084056B2

(12) United States Patent
Sonnleitner et al.

(10) Patent No.: US 11,084,056 B2
(45) Date of Patent: Aug. 10, 2021

(54) COLOR CHANGE SYSTEM

(71) Applicant: APSON Lackiertechnik GmbH, Offenbach (DE)

(72) Inventors: Harald Sonnleitner, Offenbach (DE); Heinz-Dieter Sonnleitner, Offenbach (DE); Rolf Weiler, Eppstein-Vockenhausen (DE)

(73) Assignee: APSON Lackiertechnik GmbH, Offenbach (DE)

( * ) Notice: Subject to any disclaimer, the term of this patent is extended or adjusted under 35 U.S.C. 154(b) by 128 days.

(21) Appl. No.: 16/318,994

(22) PCT Filed: Jul. 21, 2017

(86) PCT No.: PCT/DE2017/100610
§ 371 (c)(1),
(2) Date: Jan. 18, 2019

(87) PCT Pub. No.: WO2018/014915
PCT Pub. Date: Jan. 25, 2018

(65) Prior Publication Data

US 2019/0262850 A1 Aug. 29, 2019

(30) Foreign Application Priority Data

Jul. 21, 2016 (DE) ..................... 10 2016 113 505.4

(51) Int. Cl.
*F16K 11/22* (2006.01)
*B05B 12/14* (2006.01)

(52) U.S. Cl.
CPC .................................. *B05B 12/149* (2013.01)

(58) Field of Classification Search
CPC .............................. B05B 12/149; B05B 15/55
See application file for complete search history.

(56) References Cited

U.S. PATENT DOCUMENTS 2,257,004 A * 9/1941 Fleming ................ B05B 12/149 239/112
3,240,225 A * 3/1966 Barrows ................ B05B 15/55 137/240

(Continued)

FOREIGN PATENT DOCUMENTS

DE 199 62 220 A1 7/2001
DE 201 22 759 U1 8/2007

(Continued)

OTHER PUBLICATIONS

PCT/DE2017/100610, International Search Report dated Nov. 13, 2017 (Three (3) pages).

(Continued)

*Primary Examiner* — Reinaldo Sanchez-Medina
(74) *Attorney, Agent, or Firm* — Crowell & Moring LLP

(57) ABSTRACT

A color change system includes a stator having a plurality of media valves where each of the plurality of media valves has a valve closing body disposed within a valve chamber that is formed in the stator. A fluid connection is provided which emanates a plurality of control channels which lead to a respective control pressure chamber of the media valves where a respective mechanically operable switch valve is located in each of the plurality of control channels. Mechanical actuators are disposed such that only one switch valve is activatable selectively dependent on a relative position of a selector head to the stator.

18 Claims, 11 Drawing Sheets

(56) References Cited

U.S. PATENT DOCUMENTS

| | | | | |
|---|---|---|---|---|
| 3,443,578 A * | 5/1969 | Hedin | F16K 11/00 | 137/240 |
| 3,763,859 A * | 10/1973 | Yanof | A61M 5/30 | 604/70 |
| 2003/0015607 A1* | 1/2003 | Ehinger | B05B 12/149 | 239/526 |
| 2003/0118392 A1* | 6/2003 | Vetters | B05B 12/14 | 401/118 |
| 2011/0233445 A1 | 9/2011 | Robert | | |
| 2013/0255810 A1 | 10/2013 | Krogedal et al. | | |

FOREIGN PATENT DOCUMENTS

| | | | |
|---|---|---|---|
| DE | 10 2015 102 332 | A1 | 8/2015 |
| EP | 1 245 295 | A2 | 10/2002 |
| EP | 2 075 073 | A1 | 7/2009 |
| EP | 2 644 281 | A1 | 10/2013 |
| EP | 2 987 558 | A1 | 2/2016 |
| GB | 2 319 737 | B | 6/1998 |
| WO | WO 2016/015866 | A1 | 2/2016 |

OTHER PUBLICATIONS

German Search Report issued in German counterpart application No. 10 2016 113 505.4 dated Apr. 20, 2017, with English translation (Nineteen (19) pages).

* cited by examiner

COLOR CHANGE SYSTEM

BACKGROUND AND SUMMARY OF THE INVENTION

The invention is based on a color change system.

A color change system is known from DE 10 2015 102 332 A1, in which fluid-pressure-controlled media valves are arranged in a stator, whereby a media inlet, which is arranged in a selector head, which was turned by a media valve outlet of a media valve, is provided with a colored medium (varnish) as soon as the media valve is opened. In addition, a rinse line has been provided, which discharges laterally or also centrally into the media line that is connected to the media inlet. Such type of arrangement will allow the media line to be rinsed only when the selector head is in contact with the stator. Thus, during a rinse, the selector head will not be able to be turned towards the stator and a color change will therefore not occur.

According to DE 201 22 759 U1, the media valve consists of a valve closing body and a valve seat at the stator, and a fluid-operated tappet in the selector head. It will be pulled back to rinse so that the media valve closes. A rinse valve will be opened subsequently to rinse the media line, whereby the selector head is in contact with the stator to keep the media inlet closed.

According to EP 2075 073 A1, the media valve is operated by a tappet, which is firmly arranged at the selector head. The selector head is in contact with the stator in this case as well in order to keep the media inlet closed when the media line is rinsed.

A color change system is described in FIG. 1 of EP 2 987 558 A1 in which the control pressure chambers have a blow hole, respectively, whereby only the blow hole will be closed by a plug at the selector head whose control pressure chamber belongs to the media valve whose outlet is connected with the media line in the selector head. The other blow holes remain open so that no pressure can build there—even if the associated control pressure chambers are connected with an air pressure source—which would open the corresponding media valves.

The invention is based on the task of simplifying the media valves' control and to render it more secure. In particular, it should be impossible that the media valves are opened when the selector head is not yet in contact with the stator.

To solve this problem, the invention provides that the color change system exhibits a fluid connection from which several control channels emanate that lead to the media valves' control pressure chambers, whereby each control channel exhibits a mechanically operable switch valve that closes the control pressure line in its non-activated state, and which opens the control pressure line in its activated state; and that mechanically acting means are provided which are arranged in such manner that only one switch valve is activated selectively depending on the relative position from the selector head to the stator.

Selective means that only the media valve, which is overlapping with the media inlet at the stator, can be opened, respectively, when the stator and the selector head are coupled together. All other media valves remain closed at the fluid connection even when under pressure as its control channels are closed in this situation.

The media valve is preferably formed at the poppet valve, whereby the valve opening is formed by a valve seal seat. However, the media valve may also be a slide valve.

The switch valves are preferably formed such that they close the respective control pressure line in their non-activated state and that they open it in their activated state.

To achieve this, the invention further provides that the stator exhibits a fluid connection which is connected via a control channel, respectively, with the media valves' control pressure chambers in order to switch it; that a switch valve exists in the stator in each of these control channels, which is mechanically operable by a cam; and that a cam is arranged at the selector head's rear side that opens the switch valve after the selector head's rear side docks at the stator's front side, thus releasing the control channel that leads to the media valve whose media valve outlet in the stator is connected with the media inlet in the selector head.

That way one initially accomplishes that the respective media valve can only be activated when the stator and the selector head are coupled together because only then will the cam release the control channel by opening the switch valve so that the media valve can be activated by means of the fluid pressure at the fluid connection or the control channel (the control pressure).

The simplest way to realize suchlike activation consists in the selector head being vertically movable to the stator's front side, that the cam is formed at the selector head's rear side and that it protrudes from it vertically, that the switch valves are accommodated in the holes that discharge into the stator's front side whereby the cam is adjusted to dip into the holes, and that the holes are oriented in the same manner to the media valve outlets as are the cams to the media inlet.

The same objective is reached in an additional embodiment. The invention provides that the media valves are fluid-controlled, that the stator has a fluid connection at the stator's front side for each media valve that is connected via a control channel with the control pressure chamber of the respective corresponding media valve in order to switch it whereby a unilateral restrictor valve exists in each control channel, which closes in the direction of the fluid connection, and that a collector control channel runs in the selector head that ends in the selector head's rear side whereby the collector control channel's aperture is aligned with the fluid connection whose control channel leads to the media valve whose media valve outlet overlaps with the media inlet.

In yet another embodiment, the invention provides as an alternative solution that the stator exhibits a fluid connection that is connected via a control channel, respectively, with the media valves' control pressure chambers in order to switch them; that each of the control channels exhibits a feed line, which leads to a corresponding opening in the stator's selector head side whereby a pipe comes off the opening that leads to the respective media valve; that plugs are arranged at the selector head's stator side that are orientated towards the openings in such manner that at a selector head that is installed at the stator all feed lines—except for one—are closed by means of the plugs so that the feed lines' connections to the pipes are interrupted, whereby a closure exists next to the media line instead of a plug, which covers the opening without interrupting the feed line's connection to the pipe.

That way one achieves that only the media valve, which is overlapping with the media inlet, may be operated via the control line.

To that end, a common sequence valve is provided for all control channels at or in the feed line to the fluid connection. If it is opened, an activation fluid (e.g., compressed air) will be built up in the feed lines. However, as all feed lines in the media valves, which are not overlapping with the media valve, are closed, the built-up actuation pressure will not be fed to these media valves.

Only the feed line, whose opening is merely covered, continues to exhibit a connection to the pipe so that the media valve that is connected thereto and which is overlapping with the media inlet, can be activated so that the varnish can reach the media line via the media valve.

At the stator preferably exists a line (ring line or branch line) that is connected with the fluid connection. Feed lines lead from this line, which discharge into the stator's selector head side, where they form an opening. A pipe leads from these openings, respectively, which leads to the respective media valve.

A closure is provided at the selector head to close the opening of the respective active media valve. In this connection, it may be the flat area of the selector head. In the event that the selector head is completed as a disk, and has a flat front side from the get go, a partial area of this front side will form a closure.

To improve the opening's sealing, a ring seal is arranged all around to the closure area at the selector head's front side.

The plugs constitute cylinders protruding from the selector head's front side whose diameter is somewhat smaller than the feed lines. A sealing ring is located at the cylinders' lateral surface that seals the cylinder's lateral surface to the feed line's lateral surface.

At least one of the plugs exhibits a through hole so that the pressure that is acting in the feed line can be routed via a channel to assume additional switch tasks if necessary.

The feed line's connection to the pipe in the media valve's control pressure chamber also remains interrupted with this plug.

Both previously described fail-safe types to trigger the media valves can be used with a selector head, which is completed as a rotor or as a linear slide.

In general, a single color is in contact with each of the media valve inlets so that only a rinse of the media line in the selector head will really be required.

However, some rarely used colors will be introduced only via a unique media valve. Its media feed line is connected with several color containers via individually switchable lines. Therefore, the media valve must be cleaned in case the colors are changed.

However, the use of a single media valve for several colors has the advantage that less used colors will not occupy a series of media valves, which would then not be available for frequently used colors. A larger number of media valves would have to be provided, which would enlarge the change system and which would lead to longer change times in addition to it, as the selector head must execute larger distances between the media valves.

The invention is thus based on the task to set up a color change system with at least one multi-color media valve to which several colors are connected in such manner that it is possible to clean the valve after a color change, and to thus not lose time during a color change when adjusting the selector head to other media valves.

To solve the task, the invention provides that one circulation valve in the stator be assigned to a minimum of one of the media valves, whose outlet has a connection to the media valve's inlet, and that the media valve be formed such that it will be opened after pressurization of its control pressure chamber; that the circulation valve's valve closing element be connected with a set piston to which a fluid pressure was applied, and that it will be arranged within a stator, which set piston is adjacent to a control pressure chamber, whereby the circulation valve is formed in such manner that it will be closed upon pressurization of its control pressure chamber.

To varnish, a control pressure is exercised upon both control pressure chambers by which the media valve opens and closes the circulation valve. Any varnish that is present at the media feed of the media valve will be led through the open media valve in the media line to the user.

To rinse the media, a control pressure is taken from the control pressure chambers so that the media valve closes and the circulation valve opens. The consequence of this is that by means of a slide mechanism, the current varnish can initially be led back from the media valve via the switch valve into a container, and that the media valve can subsequently be cleaned using scavenging air and/or a solvent.

As the media valve's media outlet is closed in this case, the selector head does not need to be docked. Rather, it can be brought in a position to another media valve so that work can be performed with a varnish that is delivered there.

This arrangement allows for the media valve to be rinsed so that it may be used as a multi-color media valve.

Alternatively, an additional switch valve can be provided in an additional control channel that can preferably be mechanically actuated by a cam. An additional cam is arranged at the selector head's rear side that opens the additional switch valve when the selector head's rear side is applied to the stator's front side.

The fail-safe actuator of the media valves described above may be used preferably in a color change system in which at least one rinse line discharges in the line media line in which rinse line exists at least one rinse check valve that opens in the direction of the media line, whereby a lock check valve is arranged in the media inlet in a direct connection to the selector head's rear side that closes towards the selector head's rear side. A rinse line, in which a rinse check valve is located, discharges into the media line downstream of the lock check valve.

As a lock check valve exists in the media inlet, the media line can be rinsed while the selector head is separated from the stator. The rinsing agent flowing into the media line via the lock check valve closes the lock check valve.

Therefore, a change of colors can be realized relatively quickly in this manner. While the selector head wanders to a next position, the media line is rinsed in the selector head so that the color that is fed through the next media valve will not mix with the remainders in the media line. According to the invention, the conversion time is used to rinse the media line so that the change between two colors can be realized more quickly.

However, this is only a facultative option to expand the invention. As a rule, the media inlet can remain open; that is, it does not have to be provided with a lock check valve. In that case, a minimum of one rinse line discharges into the media line, in which rinse line exists a rinse check valve that opens in the direction of the media line, whereby, however, no valve exists in the media line at least in the area between the rinse line's confluence into the media line and the media inlet.

With such type of embodiment of the invention, the rinse must be realized as long as the selector head is docked at the stator, and while the media valve is closed. Therefore, the rinse takes place either after the valve was closed and before the selector head is moved any further, or after the selector head was moved on to another media valve, but before the media valve was opened. The rinsing agent cleans the media line and partially also discharges into the media valve outlet up to the media valve's lock element.

To thoroughly clean the valve closing element and the media valve's valve seal seat by means of a rinsing agent, the media valve's valve closing element is preferably located at the end of a valve shaft, whereby the valve shaft exhibits a hollow channel that ends before the valve closing body and which has lateral outlets.

The invention is to be explained in more detail below by means of examples of embodiments, whereby the cross section of the following is shown:

DETAILED DESCRIPTION OF THE DRAWINGS

Figure 1:
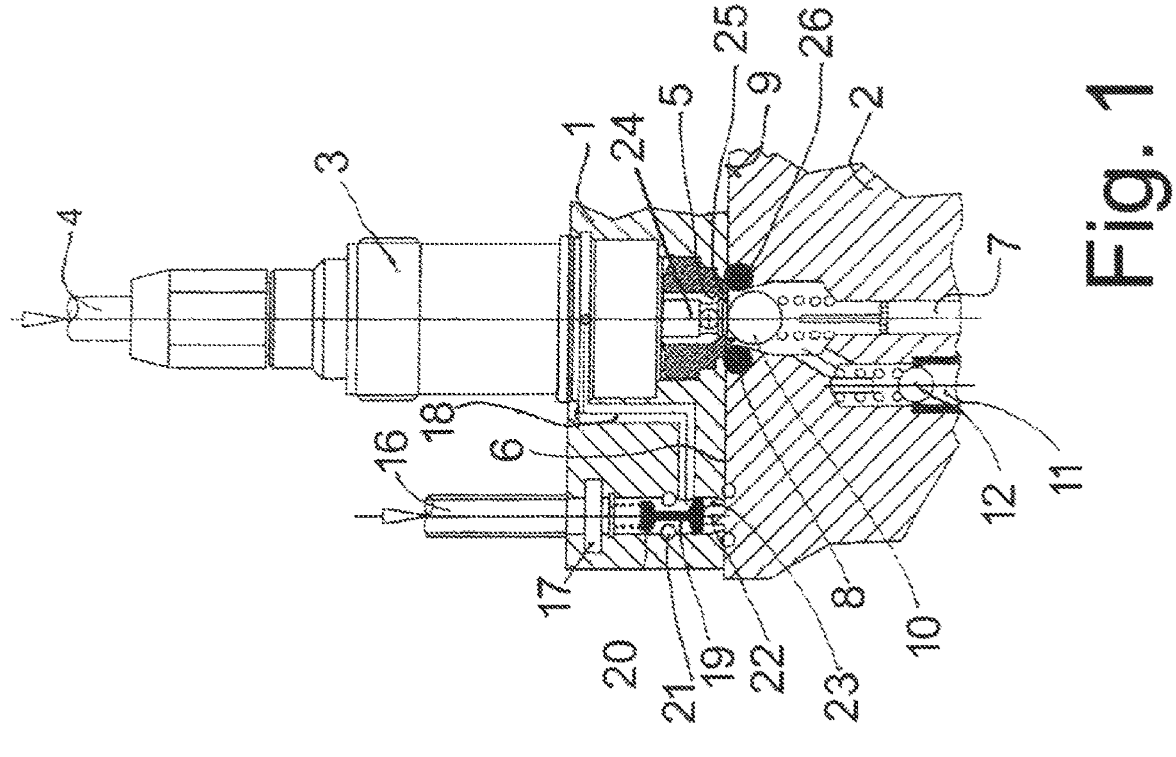
FIG. 1 illustrates a color change system in an initial embodiment and in a situation in which the stator and the selector head are coupled to each other to that the switch valve is opened and releases the control channel to the active media valve.

The system's individual positions are explained by means of FIG. 1. The same positions appear in the following figures whereby different switch situation are shown in that case, however.

The color change system consists of a stator 1 and a selector head 2, which is implemented, for example, as a rotor or as a linear slide.

A multitude of media valves 3 are located in stator 1, which are connected with a media feed line 4, respectively, and whose media valve outlets 5 are located at the front side 6 of stator 1. The media valves 3 are located, for example, on a circle so that by turning selector head 2, its media line 7, which discharges into a media inlet 8 in the rear side 9 of selector head 2, can be brought to alignment with one of the media valve outlets 5.

FIG. 1 shows only one of these media valves 3. A lock check valve 10 is located directly behind the media inlet 8, which opens into the media line 7. Downstream of media line 7 discharges at least one rinse line 11 in which another rinse check valve 12 is located, which opens in the direction of media line 7.

Figure 16:
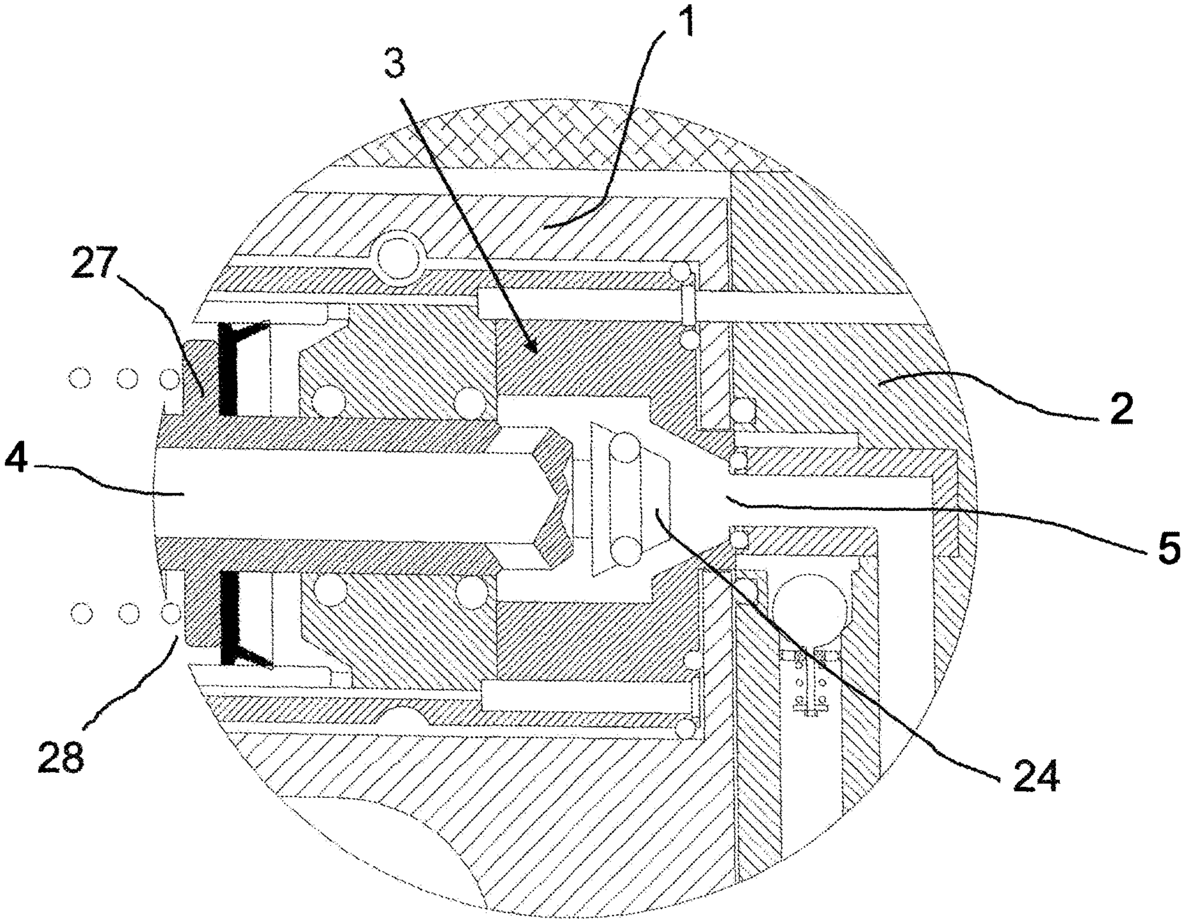
FIG. 16 illustrates a set piston.

The media valve 3 is pneumatically controlled (in principle, a hydraulic or electric control could also be an option). In addition, the valve closing body is connected with a set piston 27 on which a fluid pressure can be applied and which is arranged within the stator that is adjacent to a control pressure chamber 28. The set piston is not depicted in FIG. 1. However, a suitable embodiment of the media valve having a set piston is described in DE 10 2015 102 332 A1, FIG. 5 of which DE reference is utilized for FIG. 16: The valve closing elements are located within a valve chamber that is formed in the stator, and they are adjustable against a valve seal seat that is directed in the valve chamber.

Each media valve 3 is embedded in a cartridge, which is attached in a recession at the rear side of the stator 1. Within the cartridge exists a hollow valve shaft at whose head the valve closing element is arranged, which is conically formed. It acts together with the valve seat that is also conically shaped and which is formed in the cartridge's head. The hollow embodiment of the valve shaft causes the medium to be led in an aerodynamically efficient manner.

Stator 1 has a fluid or compressed air connection 16 at a ring line or branch line 17 at its rear side that is connected via a control channel 18, respectively, with the activation of media valves 3. A switch valve 19 is located in each of these control channels 18, which exhibits, for example, a dumbbell-shaped closing body 20 whereby one head of closing body 20 can be applied to a seal ring 21 so that control channel 18 will be closed.

The actuation of closing body 20 is realized by means of a cam 22, which is located at the rear side 9 of a selector head 2, and which dips into a hole 23, in which the switch valve 19 is located.

FIG. 1 shows that the stator 1 and selector head 2 are apposed, i.e., they are coupled, so that cam 22 dips into the hole 23 and opens switch valve 19, that is, it releases its passage so that the control channel 18 will be released. However, since no pressure has been exercised at compressed air connection 16, the media valve 3 is still closed, that is, its valve closing body 24 is still in contact with valve seal seat 25. The lock check valve 10 is slightly opened as its valve ball is abutting to valve closing body 24 of the media valve 3.

Figure 2:
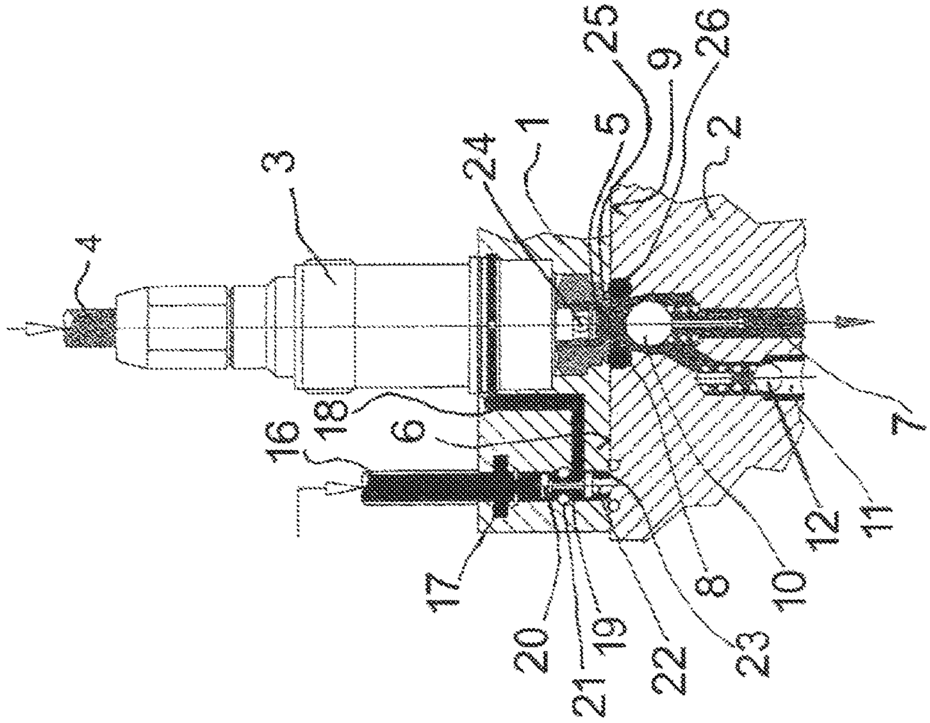
FIG. 2 illustrates the situation as in FIG. 1, whereby a control fluid is led to the media valve via a fluid connection via the open control channel so that it opens.

FIG. 2 shows a situation in which the pressurized air is in contact with compressed air connection 16. As a result, media valve 3 opens whereby the valve closing body 24 removes itself from valve seal seat 25. The inflowing varnish pushes the valve ball of lock check valve 10 before itself and further opens media inlet 8. The rinse line 11 will be blocked by the rinse check valve 12.

Figure 3:
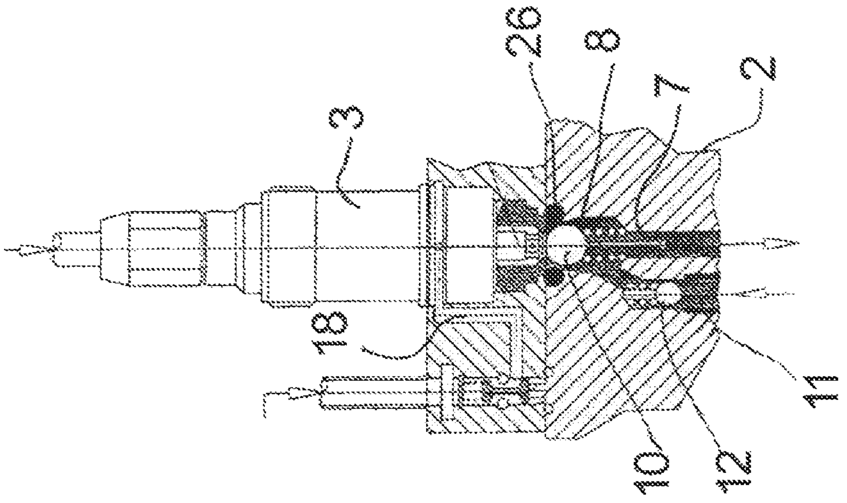
FIG. 3 illustrates the situation as in FIG. 1, whereby a rinsing agent is fed to the media line in the selector head with the media valve closed via at least one rinse line.

As shown in FIG. 3, the compressed air will be turned off to change a color so that the media valve 3 closes and the lock check valve 10 will change to a mostly closed position. If a rinsing agent is introduced via the rinse line 11, the rinse check valve 12 opens and the rinsing agent flows into the media line 7. A discharge via the media inlet 8 is prevented as it is sealed by means of a seal ring 26 towards the exterior.

Figure 4:
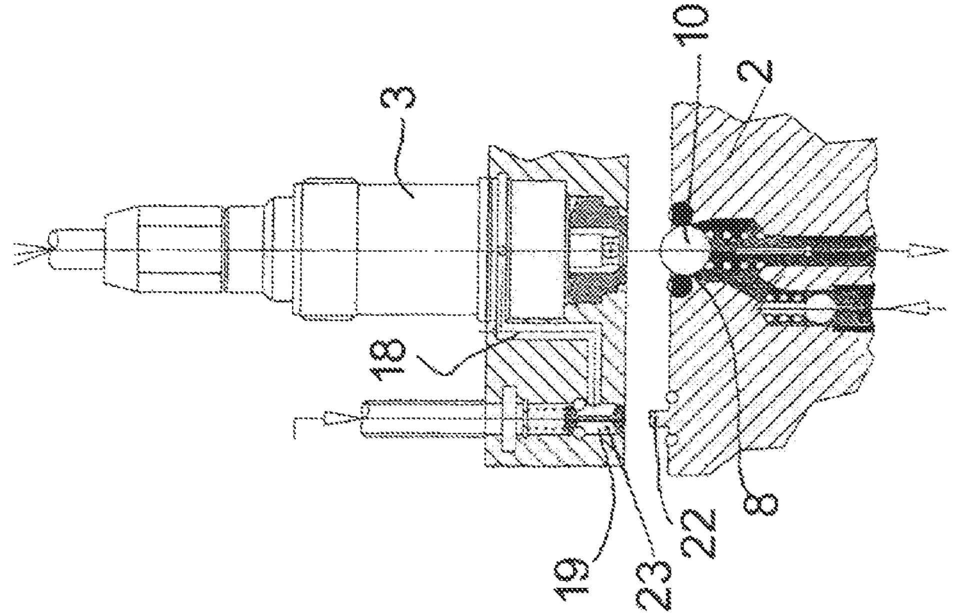
FIG. 4 illustrates a situation, in which the stator and the selector head are decoupled from each other and a rinsing agent continues to be fed via the media line's rinse line.

When now pulling back selector head 2 (see FIG. 4), so that the media inlet 8 is placed opposite an additional media valve 3 by means of turning it or sliding it in a parallel manner, switch valve 19 will be initially closed because the cam 22 had pulled back from the hole 23. In addition, the lock check valve 10 closes completely so that the media inlet 8 is closed, and the rinse can be continued during the movement of selector head 2 to the next media valve 3. This is associated with a considerable saving in time.

Figure 6:
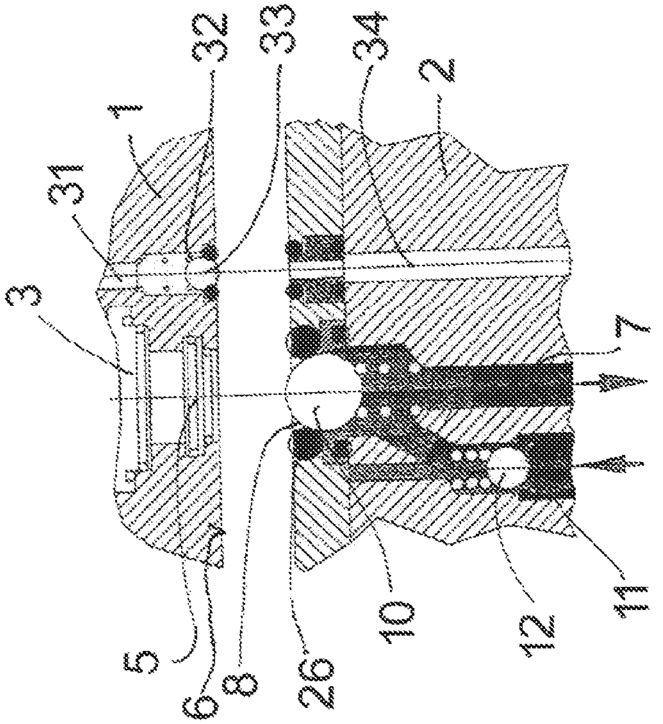
FIG. 6 illustrates a situation of the second embodiment where the stator and the selector head are decoupled from each other, and a rinsing agent continues to be fed via the media line's rinse line.
Figure 5:
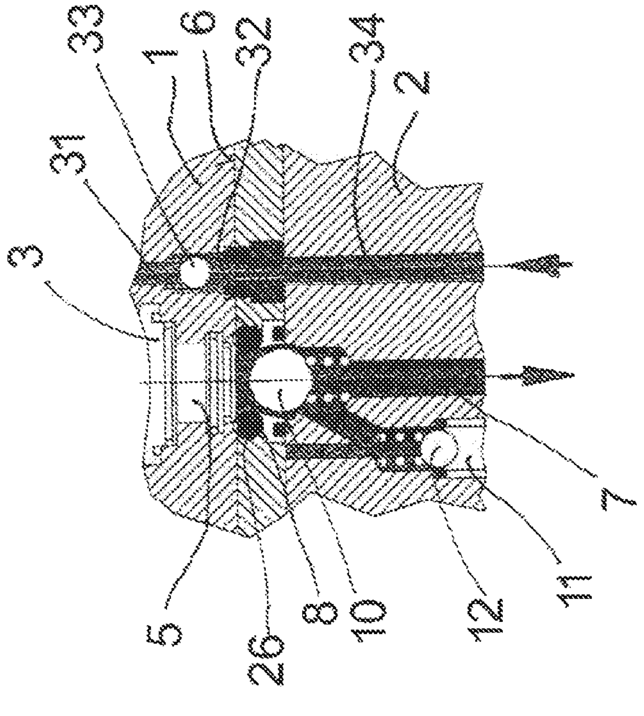
FIG. 5 is an enlarged section of a color change system in a second embodiment in a situation in which the stator and the selector head are coupled with each other.

An additional embodiment of the invention is shown in FIGS. 5 and 6. Contrary to the embodiment described above, no cam-activated switch valve is provided. Rather, each media valve 3 is connected with its own control channel 31 to a particular fluid connection 32 at the front side 6 of stator 1. A check valve 33 is located in each fluid connection 32 that closes towards the front side 6. A single collector control channel 34 is located in selector head 2 that is connected with a fluid source not depicted here (compressed air connection). The confluence of the collector control channel 34 is respectively aligned with the fluid connection 32 (compressed air connection) whose control channel 31 leads to media valve 3 and whose media valve outlet 5 is overlapping with media inlet 8 in selector head 2. An actuation by means of the compressed air will open the media valve 3 so that varnish will be led into media inlet 7 over it to a spray nozzle that is not depicted here.

Figure 7:
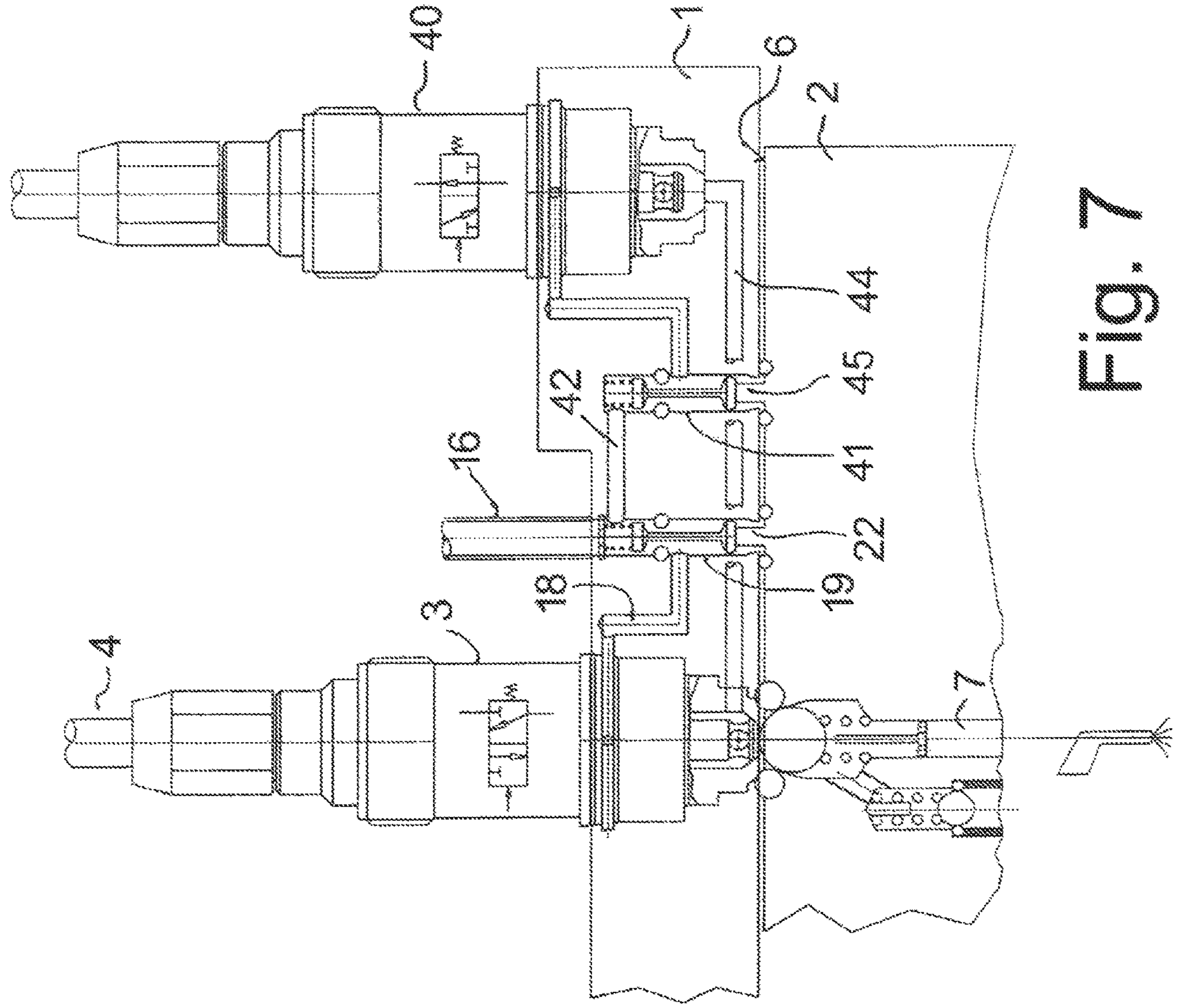
FIG. 7 illustrates a stator having a media valve and a circulating valve whereby the selector head is docked at the stator, but where no control pressure is exerted at the fluid connection so that the media valve and the circulating valve are in their basic positions.

In FIG. 7, the combination of a media valve 3 that is to be used as a multi-color media valve is shown with a circulating valve 40. The connection of the media valve 3 corresponds to what is depicted in FIG. 1 through 4. Beside it is a circulating valve 40, which basically exhibits the same structure as the media valve. However, the set piston, which is not shown here, is arranged in such manner that a pressurization via an additional control channel 42 will lead to the closure of the valve—and not—as with the media valve, to an opening of the valve.

The arrangement shown here of media valve 3 and circulating valve 40 serves to clarify the mode of operation. As a rule, the amount of media valves 3 required is such that they can be arranged on two circles at the stator 1. In doing so, the media valves 3 and circulating valves 40 are preferably arranged in different circles—offset to each other. This generally requires that two parallel switch valves (19, 41) be provided, namely one for the media valve 3, and an additional switch valve 41 for the circulating valve 40, as depicted here. However, only one switch valve will be required to function that opens or closes the control channels 18, 42.

Figure 9:
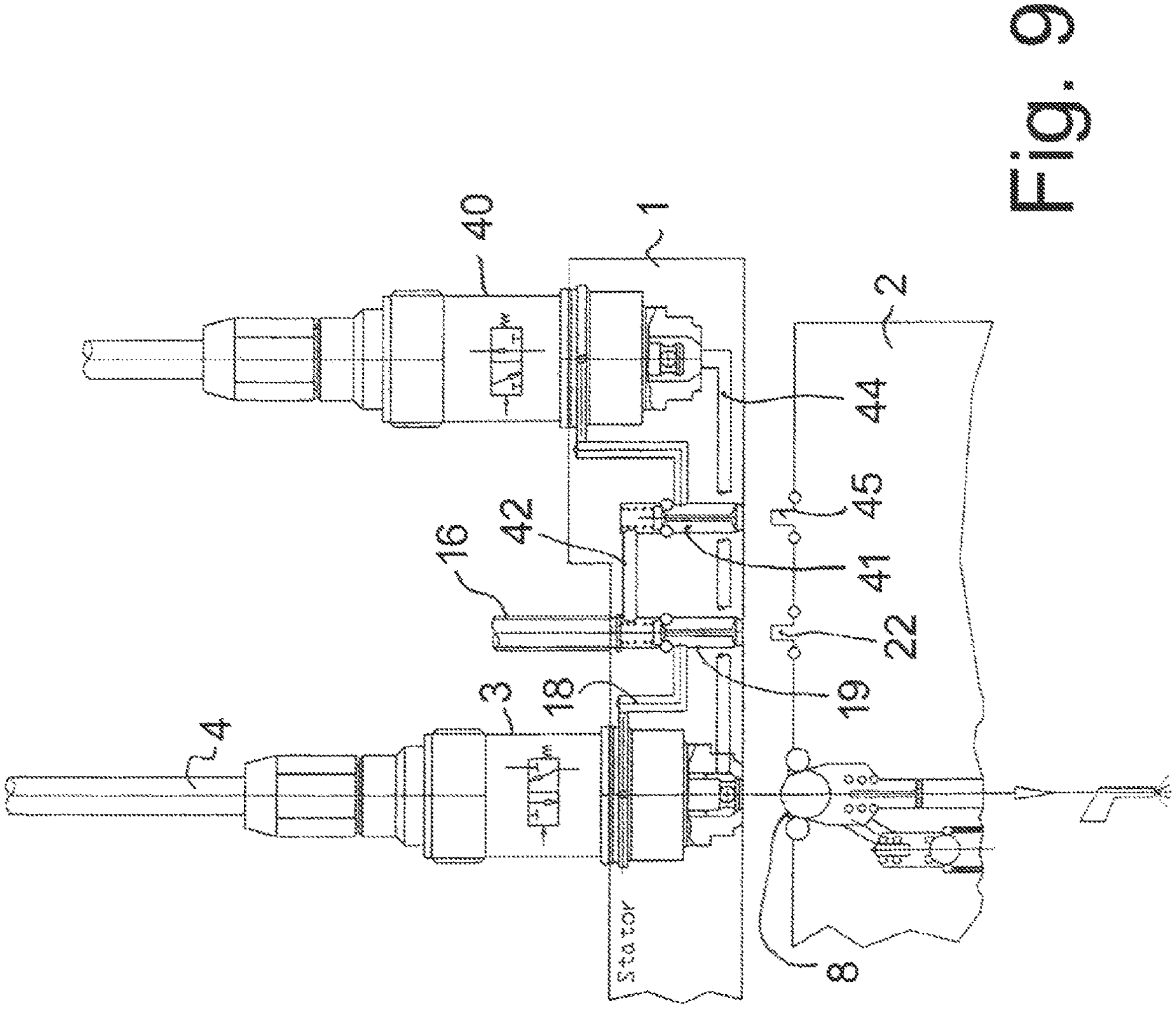
FIG. 9 illustrates a stator with a media valve and a circulating valve, whereby the selector head is removed from the stator so that the switch valves are closed.

As can be gathered from FIG. 9, the media valve outlet of circulating valve 40 does not have an aperture into the frontside 6 of stator 1, but rather, it is connected via a connective channel 44 within the stator 1 with the valve chamber of media valve 3.

In the position shown in FIG. 7 of stator 1 and selector head 2, the additional switch valve 41 is actuated by an additional cam 45 at the selector head 2 so that it is opened. However, no pressure exists at the fluid connection 16. The consequence of this is that the media valve 3 is closed and the circulating valve 40 is opened. Thus, there exists a continuous connection between the media valve 3 and the circulating valve 40 through the connective channel 44, which can be used to change colors and to rinse—as explained further below.

The additional control channel 42 to the circulating valve 40 can basically also be controlled by the switch valve 19 of the media valve 3 so that the depicted additional switch valve 41 can be eschewed for the circulating valve 40.

Figure 8:
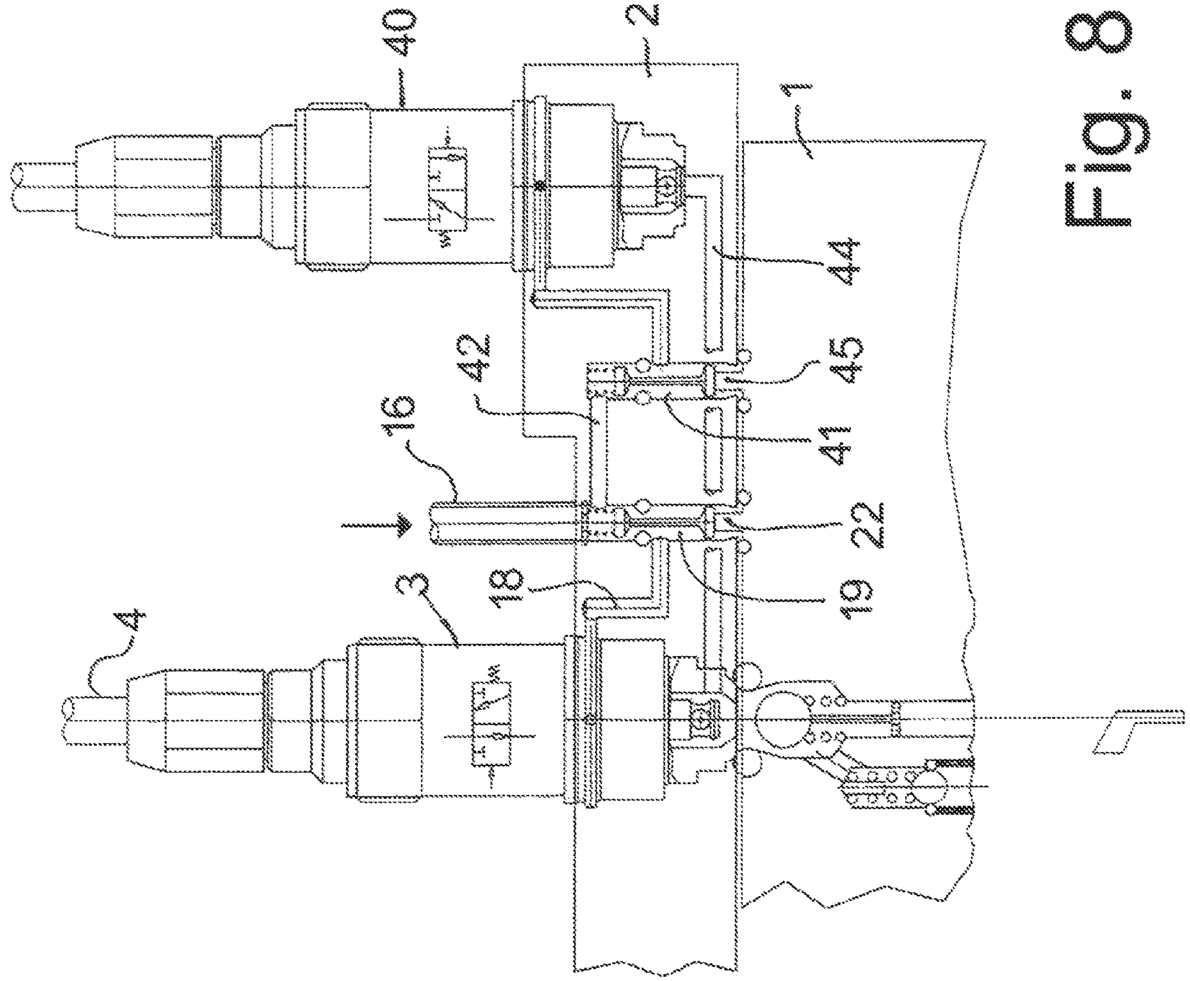
FIG. 8 illustrates the same situation as in FIG. 7, however, a control pressure is exerted so that the media valve and the circulating valve are switched.

FIG. 8 shows the same situation as in FIG. 7. However, in this case, a control pressure is applied at the fluid connection which causes the media valve 3 to open and the circulating valve 40 to close.

A medium that is in contact with the media feed line 4 of the media valve can, as described in connection with FIG. 1 through 4, reach into the media line 7 via the open media valve 3 and further on to a consumption (spray gun). A return flow of the medium via the circulating valve 40 will not occur as it is closed.

FIG. 9 shows the situation during a change of colors. The selector head 2 has been removed from the stator 1 and can thus be turned into a new position so that its media inlet 8 can turn into a media valve outlet of another media valve process.

As cams 22, 45 are removed from the switch valves 19, 41 as well, they are closed so that independently of a pressurization at the fluid connection 16, which might be necessary to open the other media valves, the shown media valve 3 will be closed and the circulating valve 40 will be opened in any event.

This will allow for a change of colors and a subsequent rinse of both valves. For this purpose, a so-called push medium will be let in initially at the media feed line 4 of the media valve, which pushes out the current color from the media valve 3 and the circumference valve 40; subsequently the rinse medium and air are fed in turns to clean the media valve, the connective channel 44, and the circulating valve from the remaining varnish. It is possible thereafter to apply a new color of varnish via the media feed line 4 of the media valve 3. It is also possible to feed a new color or a rinsing agent to the respective media valve 3 via the circulating valve 40.

This rinse process occurs while the system continues to operate as a whole, and color is delivered to another media valve where applicable.

Figure 10:
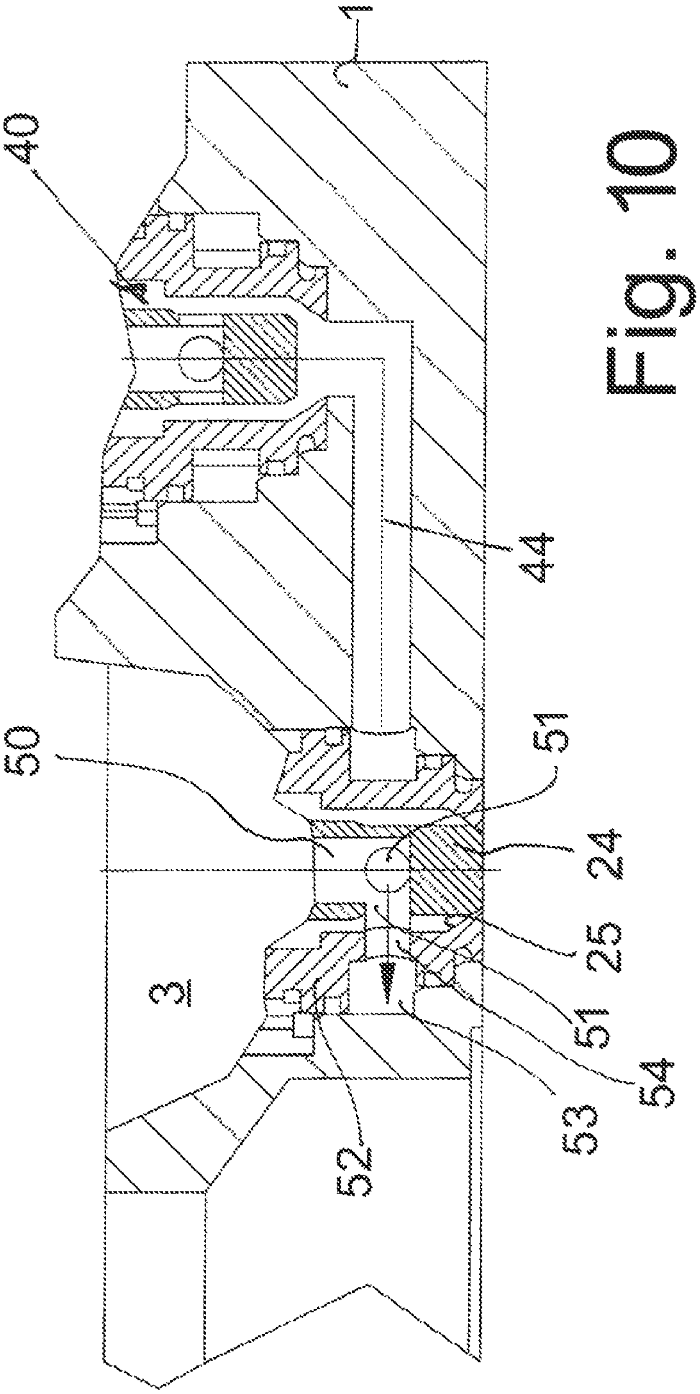
FIG. 10 is an enlarged view of the valve closing body and the valve seat of a media valve and a circulating valve.

To thoroughly clean the area of the media valve 3 around the valve closing body 24 and the valve seal seat 25, it must be provided—as FIG. 10 depicts—that the valve shaft exhibits a hollow channel 50 that ends before the valve closing body 24 and which exhibits lateral outlets 51.

The head dips into a sheath 52 in which valve seal seat 25 of the media valve 3 is formed, and in whose outer lateral surface runs a circumferential groove. Since the lateral surface abuts at the wall of a media valve locating hole in stator 1, a ring channel 53 is created that is connected with hollow channel 50 via a cross hole 54 in sheath 52.

The cross hole 54 is located at the level of the lateral outlets 51 of valve closing body 24 when it is in its closed position.

The connective channel 44 discharges into ring channel 53 opposite cross hole 54.

The air or the rinse medium which exists from the lateral outlets 51 is thus forced to flow outside around the valve closing body 24 to enter the ring channel 53 via the cross hole 54 to be able to flow from there in the direction of the connective channel 44. This opposite arrangement of connective channel 44 and cross hole 54 ensures that the valve closing body 24 will be cleaned all-around.

Figure 11:
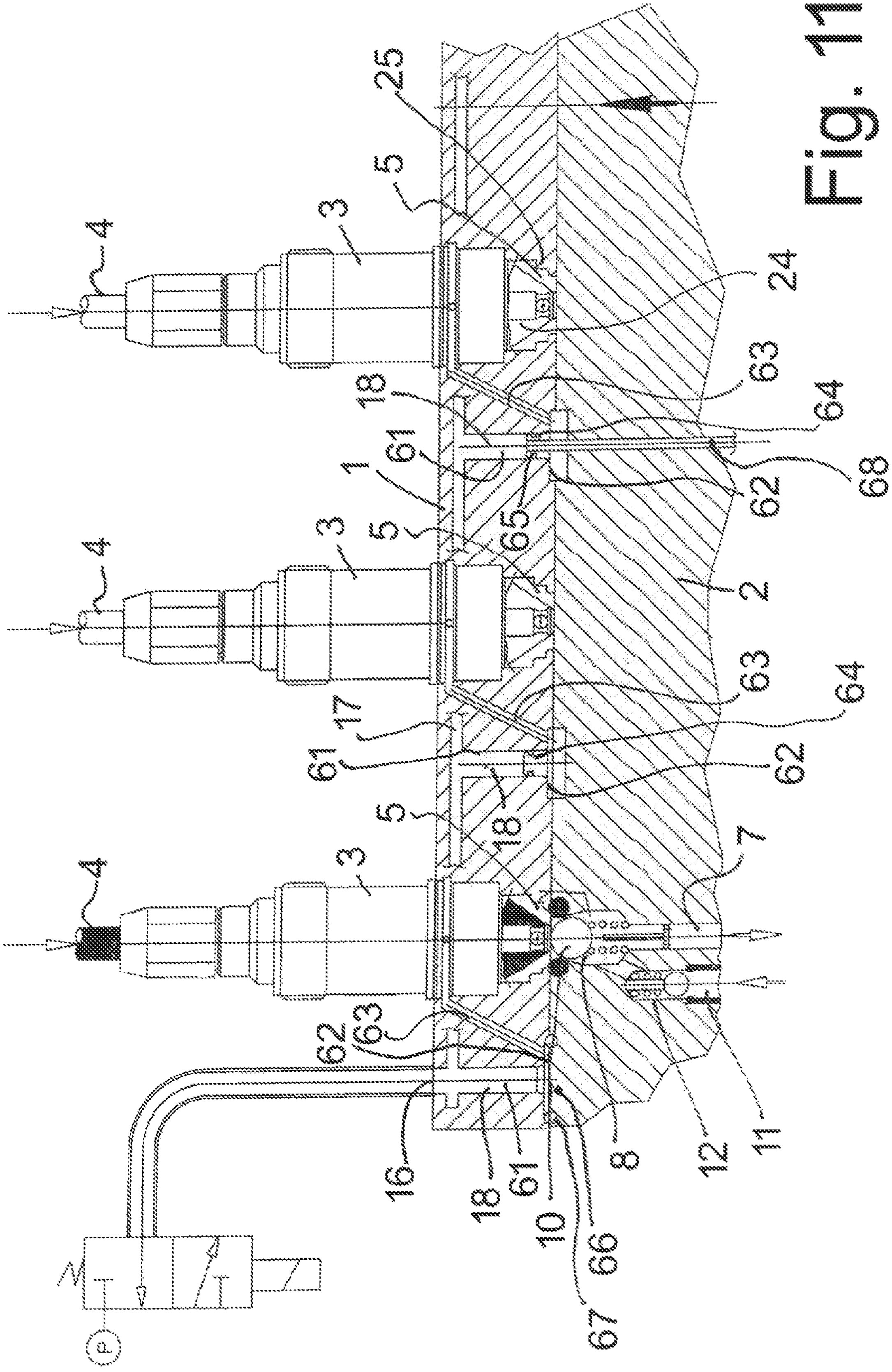
FIG. 11 illustrates the cross section of an additional color change system in a situation in which the selector head is docked at the stator so that the media valve that is aligned with the media inlet, is opened.

An additional example of an embodiment is to be explained by means of FIG. 11.

The color change system consists—as mentioned before—of a stator 1 and a selector head 1, which is realized, for example, as a rotor.

A multitude of media valves 3 are located in the stator 1, which are connected with a media feed line 4, respectively, and whose media valve outlets 5 are situated at the front side 6 of stator 1. The media valves 3 are resting on one or several concentric circles, for instance, so that by turning selector head 2 its media line 7, which discharges into a media inlet 8 on the rear side 9 of selector head 2, can be aligned with one of the media valve outlets 5. In the illustration in FIG. 11, the media valves are only shown next to each other in order to simplify the depiction. In actual fact, all have the same distance to the rotational axis of selector head 2.

A minimum of one lock check valve 10 is located directly behind the media inlet 8, which opens in the media line 7. A rinse line 11 discharges downstream from media line 7, in which an additional rinse check valve 12 is located, which opens in the direction of the media line 7.

The media valve 3 is pneumatically controlled (in principle, a hydraulic or electric control would be an option as well). In addition, the valve closing body is connected with a set piston on which a fluid pressure can be applied and which is arranged within the stator that is adjacent to a control pressure chamber. The set piston is not shown here. However, a suitable embodiment of the media valve having a set piston is described in DE 10 2015 102 332 A1: The valve closing elements are located, respectively, within a valve chamber that is formed in the stator 1, and they are adjustable against a valve seal seat that is directed in the valve chamber.

Each media valve 3 is embedded in a cartridge, which is attached in a recession on the rear side of the stator 1. Within the cartridge exists a hollow valve shaft, at the head of which the valve closing element is arranged, which could be, for example, conically formed. It acts together with the valve seat that is also conically shaped, and which is formed in the cartridge's head. The hollow embodiment of the valve shaft causes the medium to be led in an aerodynamically efficient manner.

The stator 1 has a fluid or compressed air connection 16 at a ring line 17 at its rear side that is connected, respectively, via a control channel 18 with the activation of media valves 3.

Feed lines 61 proceed from ring line 17, which discharge into openings 62 in the selector head side of the stator 1, and proceed vertically to it.

The opening 62 has a larger cross section than the feed line 61 itself so that a diagonal pipe 63 proceeds to the respective media valve 3 from the bottom of the openings. These openings 62 all have the same orientation to the respective media valve 3.

A multitude of plugs 64 are located at the stator side of the selector head 2, whereby its number is less by one than the number of media valves 3 or the number of the respective corresponding openings 62.

The distribution of plugs 64 on the selector head 2 corresponds to the distribution of the openings at the stator 1 so that all plugs 64 will find an opening 62, respectively, when the selector head 2 is docked at the stator 1 which is independent from the direction of its rotational angle towards the stator 1.

The plugs 64 are short cylinders which dip into the feed lines 61, whereby a seal ring 65 is located at the cylinders' outer edge that is applied at the lateral surface of feed line 61; that is, when the plug 64—as it is shown in FIG. 11—has dipped into the feed line.

No plug 64 is located next to the media inlet 8 but there exists a closure 66 so that the feed line 61 to the media valve 3, which is located across from the media inlet 8, will not correspond with a plug 64, and will thus not be interrupted. The closure 66 merely covers the opening 62. This will prevent a leakage of the control fluid of fluid connection 16, but it will not prevent the access to pipe 63.

As in this example of an embodiment, the selector head 2 is formed by a disk, which exhibits a flat front side facing the stator; the closure 66 will be formed by a partial area of the front side, which fully covers the respective opening 62. The imperviousness of the partial area towards the opening 62 can be improved by placing a seal ring 67 in the front side, which surrounds the opening 62.

The FIG. 11 shows that the stator 1 and the selector head 2 are apposed, i.e., they are docked, so that all feed lines 61 are closed except for one. As long as no pressure is applied at fluid connection 16, the active media valve 3 will remain closed, i.e., its valve closing body 24 is still in contact at valve seal seat 25. The lock check valve 10 is slightly opened as its valve ball is applied at the valve closing body 24 of the media valve 3.

The media valve 3 will be opened as soon as the compressed air is applied at the fluid connection 16, by which means the valve closing body 24 distances itself from the valve seal seat 25. The inflowing varnish pushes the valve ball of the lock check valves 10 before itself and further opens the media inlet 8. The rinse line 11 will be locked by means of the rinse check valve 12.

To change a color, the compressed air will initially be turned off again so that the media valve 3 will close and so that the lock check valve 10 will move into a position that is mostly closed. When introducing a rinse agent via the rinse line 11 at this time, the rinse check valve 12 will open and the rinse agent will flow into the media line 7. A discharge via the media inlet 8 will be prevented as it is sealed off by means of a seal of the lock check valve 10.

All the examples of embodiments presented so far have in common that a lock check valve 10 has been provided. However, the respective suggested control of the media valves 3 can also be used independently from the arrangement of a lock check valve 10 in the media inlet 8. A lock check valve 10 allows for a rinse even if a selector head 2 was separated from the stator 1, in other words in case of a continued movement of the selector head 2 from one media valve 3 to the next. No lock check valve will be required when wanting to pass on a rinse during the change of position of the selector head 2, as the media lines' rinse can be realized even if the selector head 2 is docked with a closed media valve 3, however.

Figure 12:
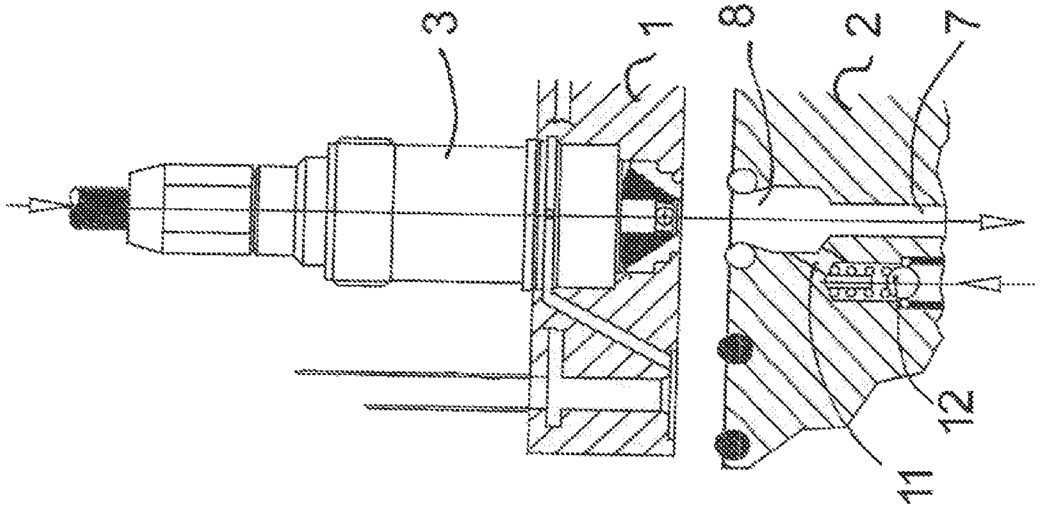
FIG. 12 illustrates excerpts of the selector head with a media line and a valve-free media inlet 8.

FIG. 12 shows excerpts of the selector head 2 with a media line 7 and a media inlet 8 without a lock check valve. A rinse line 11 having a rinse check valve 12 continues to discharge into the media line 7. To be able to control the release of varnish in the direction of the consumer, additional valves can be provided in the media line 7 downstream from the confluence of the rinse line 11.

Figure 13:
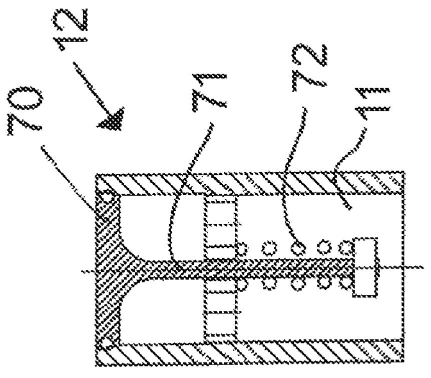
FIG. 13 illustrates an initial modification of the rinse check valve.

FIG. 13 shows an alternative embodiment free of dead spaces of a rinse check valve 12. A closing plate 70 lies in the rinse line 11 directly before its opening in the media line and it is sealed off to the lateral surface of rinse line 11. At the rear side of the closing plate 70 is located a shaft 71 where a valve spring 72 braces itself, which is chucked between a section at shaft 71 and a section in the rinse line 11. The rinse check valve 12 will be opened by a pressure in the rinse line 11. In its opened state, the closure plate 70 has left the rinse line 11 and is in the media line 7 without locking it.

Figure 14:
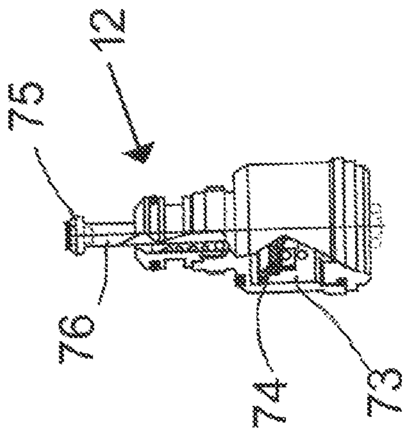
FIG. 14 illustrates a second modification of a rinse check valve in form of a rinse valve with an external selection.

FIG. 14 shows the cross section of an additional embodiment of the rinse check valve 12. In this embodiment, it is specifically opened by an external control medium for which purpose a set piston 74 is arranged in a control chamber 73 that is connected with the closing body 75 of the rinse check valve 12 via a shaft 76.

Figure 15:
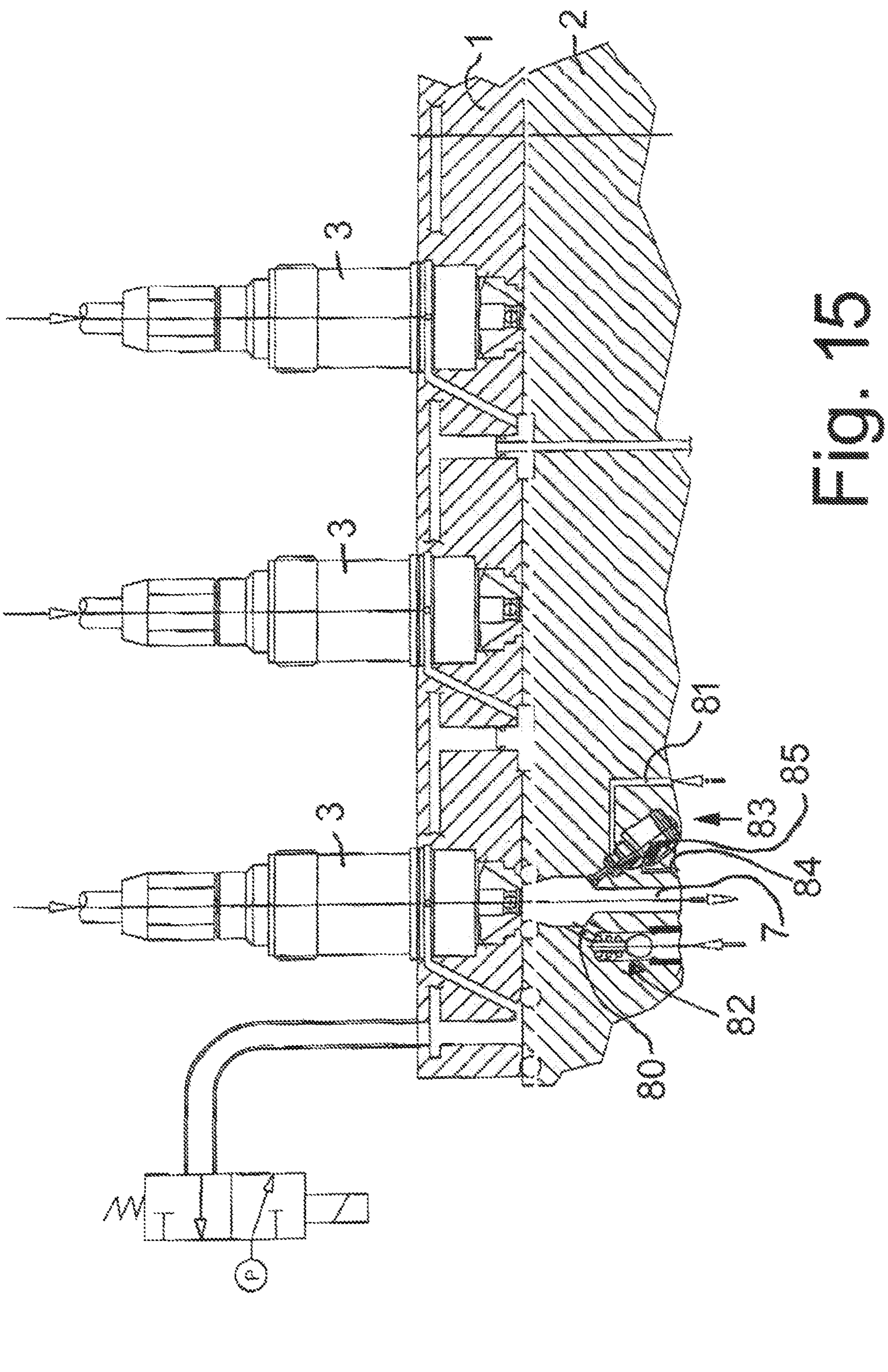
FIG. 15 illustrates a color change system with a media line into which a first and a second rinse line discharge.

FIG. 15 shows a color change system according to FIG. 11 having a stator 1 and a selector head 2 whereby, contrary to FIG. 11, the media line 7 is open; that is, where thus no lock check valve was provided. A first rinse line 80 and a second rinse line 81 discharge into media line 7, whereby a rinse check valve is in the first rinse line, which is formed according to FIG. 12 or FIG. 13. A valve 83 is located in the second rinse line 81, which can be actuated by an external control medium, and which resembles the valve depicted in FIG. 14 in its setup. This second rinse line 81 serves to feed a slide mechanism into the media line 7 in particular.

The valve 83 is actuated in a fluidic manner, and particularly in a pneumatic manner. For this purpose, a fluid channel 84 leads into an activation chamber 85 of the valve 83. If this chamber 85 is pressurized, valve 83 will open so that for instance a push medium reaches the media line 7 via the second rinse line 81 that is now open.

REFERENCE CHARACTERS

| | |
|---|---|
| 1 | Stator |
| 2 | Selector head |
| 3 | Media valves |
| 4 | Media feed |
| 5 | Media valve outlets |
| 6 | Front side |
| 7 | Media line |
| 8 | Media inlet |
| 9 | Rear side |
| 10 | Lock check valve |
| 11 | Rinse line |
| 12 | Rinse check valve |
| 16 | Fluid connection |
| 17 | Ring or branch line |
| 18 | Control channel |
| 19 | Switch valve |
| 20 | Closing body |
| 21 | Seal ring |
| 22 | Cams |
| 23 | Hole |
| 24 | Valve closing body |
| 25 | Valve seal seat |
| 26 | Seal ring |
| 31 | Control channel |
| 32 | Fluid connection |
| 33 | Check valve |
| 34 | Collection control channel |
| 40 | Circulating valve |
| 41 | Additional switch valve |
| 42 | Additional control channel |
| 44 | Connective channel |
| 45 | Cams |
| 50 | Hollow channel |
| 51 | Outlets |
| 52 | Sleeve |
| 53 | Ring channel |
| 54 | Cross hole |
| 61 | Feed lines |
| 62 | Openings |
| 63 | Pipe |
| 64 | Plug |
| 65 | Seal ring |

-continued

| | |
|---|---|
| 66 | Closure |
| 67 | Seal ring |
| 68 | Through-hole |
| 70 | Closure plate |
| 71 | Shaft |
| 72 | Valve spring |
| 73 | Control chamber |
| 74 | Set piston |
| 75 | Closing body |
| 76 | Shaft |
| 80 | First rinse line |
| 81 | Second rinse line |
| 82 | Rinse check valve |
| 83 | Valve |
| 84 | Fluid channel |
| 85 | Actuation chamber |

The invention claimed is:

1. A color change system, comprising:

a stator with a front side and having a plurality of media valves (3), wherein a respective inlet of the plurality of media valves is connected with a media feed line (4), wherein a respective outlet (5) of the plurality of media valves discharges into the front side of the stator (1), wherein each of the plurality of media valves (3) has a valve closing body (24) disposed within a valve chamber that is formed in the stator, wherein the valve closing body is slidable toward a valve opening (25), wherein the valve closing body is connected with a set piston (27) that is pressurizable by a fluid pressure and which is disposed within the stator, wherein the set piston adjoins a respective control pressure chamber (28) of the plurality of media valves; and a selector head (2) which is rotatable and is disposed before the front side of the stator (1) around an axis proceeding vertically to the front side of the stator and/or which is slidable parallel to the front side of the stator;

wherein the selector head (2) has a media inlet (8) at a rear side of the selector head facing the front side of the stator, wherein the media inlet is alignable, by turning and/or sliding the selector head (2), with one of the media valve outlets (5), and wherein the selector head (2) has a media line (7) which connects the media inlet (8) with a media extraction of the color change system;

a fluid connection (16) from which emanates a plurality of control channels (18) which lead to a respective control pressure chamber of the media valves (3) wherein a respective mechanically operable switch valve is located in each of the plurality of control channels; and mechanical actuators which are disposed such that only one switch valve is activatable selectively dependent on a relative position of the selector head (2) to the stator (1).

2. The color change system according to claim 1, wherein the switch valves are formed such that they lock the respective control pressure line in their non-activated state and such that they open it in their activated state.

3. The color change system according to claim 2, wherein the respective switch valves (19) are actuatable mechanically by a cam, respectively, wherein the cam (22) is arranged at the rear side of the selector head (2) which, after the rear side of the selector head is docked to the front side of the stator, opens the switch valve (19) and thus the control channel (18), which leads to the media valve (3), and whose media valve outlet (5) in the stator is connected with the media inlet (8) in the selector head (2).

4. The color change system according to claim 3, wherein the selector head (2) is movable vertically to the front side of the stator, wherein the cam (22) is formed at the rear side of the selector head (2) and protrudes vertically from it, wherein the switch valves (19) are accommodated at holes (23) that discharge at the front side of the stator, wherein the cam (22) is adapted to dip into the holes, and wherein the holes are orientated, respectively, in a same manner to the media valve outlets (5) as the cam (22) to the media inlet (8).

5. The color change system according to claim 1, each of the control channels has a feed line (61), which leads to a corresponding opening (62) in the selector head side of the stator (1), wherein a pipe (63) emanates from the opening (62), which leads to the respective media valve (3), wherein a plug (64) is arranged at a stator side of the selector head (2) that are orientated in such manner to the openings (62) that at the selector head (2), which is applied at the stator (1), all feed lines (61) will be closed by the plug (64) except for one so that the connection of the feed lines (61) to the pipes (63) will be interrupted, wherein next to the media inlet (8) a closure (66) exists instead of the plug, which closure covers the corresponding opening (62) without interrupting the connection of the feed line (16) to the pipe (63).

6. The color change system according to claim 5, wherein a line (17) running in the stator (1), which line is connected to the fluid connection (16), from which the feed lines (61) emanate which discharge into the selector head side of the stator (1), where they form the opening (62), respectively, wherein the pipe (63) emanates from each opening (62) that leads to the respective media valve (3).

7. The color change system according to claim 6, wherein the closure (66) is provided to close the opening (62) of the respective active media valve (3) at the selector head (2).

8. The color change system according to claim 7, wherein the closure (66) is formed by a closure area at the front side of selector head (2), wherein the closure area is surrounded by a ring seal (67).

9. The color change system according to claim 5, wherein the plug (64) is cylinders that protrude from the front side of the selector head (2) whose diameter is a little bit smaller than the feed lines (61).

10. The color change system according to claim 5, wherein a seal ring (65) is located, respectively, at a cylinder's lateral surface that seals the cylinder's lateral surface off to a lateral surface of the feed line (61).

11. The color change system according to claim 5, wherein at least one of the plugs (64) has a through-hole (68).

12. The color change system according to claim 1, wherein a circulating valve (40) is assigned to at least one media valve (3) in the stator (1), whose outlet has a connection to the inlet of the media valve (3), wherein the media valve (3) is formed such that it will be opened after its control pressure chamber was pressurized, wherein the valve closing body of the circulating valve (40) is connected with the set piston, which is arranged within the stator (1) and which is pressurizable with a fluid pressure, and which set piston is adjacent to the control pressure chamber, wherein the circulating valve (40) is formed such that it will be closed when its control pressure chamber is pressurized.

13. The color change system according to claim 12, wherein the control pressure chamber of the circulating valve (40) is connected with the fluid connection (16) via a switchable additional control channel (42).

14. The color change system according to claim 13, wherein an additional switch valve (41) is located in the additional control channel (42).

15. The color change system according to claim 14, wherein the additional switch valve (41) in the additional control channel (42) is mechanically operable by a cam (45), wherein an additional cam (45) is mounted at the rear side of selector head (2), which opens the additional switch valve (41) that belongs to the circulating valve (40) when the rear side of the selector head (2) is applied to the front side of the stator (1).

16. The color change system according to claim 1 further comprising at least one rinse line (11), in which is at least one rinse check valve (12) that opens in the direction of the media line (7) discharging into the media line (7), wherein a lock check valve (10), which locks towards the rear side of the selector head (2), is disposed in the media inlet (8), which is directly connected to the rear side of the selector head (2), and wherein a rinse line (11), in which a rinse check valve (12) is located, discharging downstream of the lock check valve (10) into the media line (7).

17. The color change system according to claim 1 further comprising a minimum of one rinse line (11), in which is located at least one rinse check valve (12) that opens in the direction of the media line (7) discharging into the media line (7), wherein there is no valve in the media line at least in the area between the confluence of the rinse line (11) into the media line (7) and the media inlet (8).

18. The color change system according to claim 1, wherein the valve closing body (24) is located at the end of a valve shaft, wherein the valve shaft exhibits a hollow channel (50), which ends before the valve closing body (24), and which has lateral outlets (51).

* * * * *